Oct. 9, 1951   J. W. ANDERSON, JR   2,571,002
REARVIEW MIRROR SUPPORT
Filed March 29, 1950
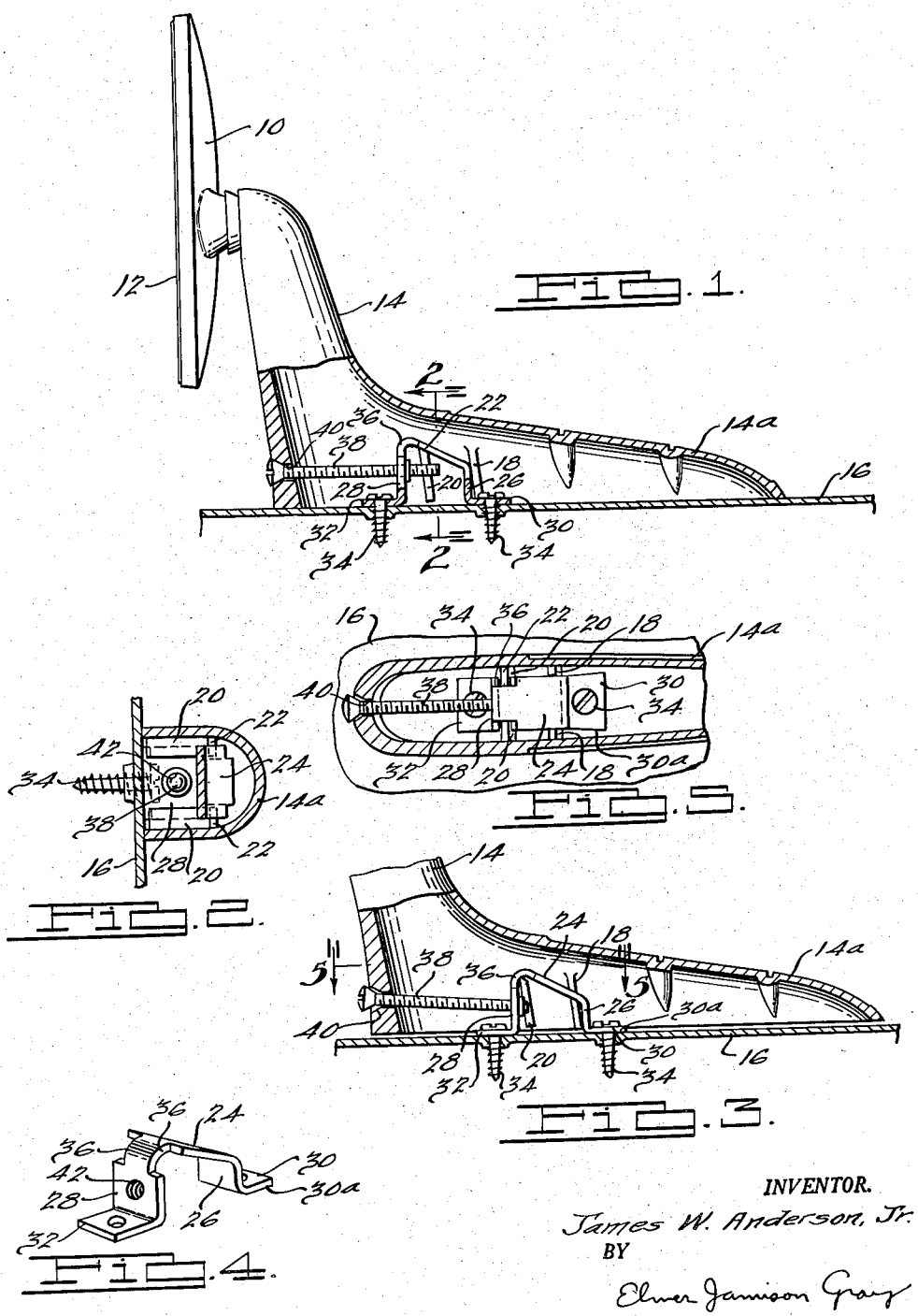
INVENTOR.
James W. Anderson, Jr.
BY
Elmer Jamison Gray
ATTORNEY.

Patented Oct. 9, 1951

2,571,002

UNITED STATES PATENT OFFICE 2,571,002

REARVIEW MIRROR SUPPORT

James W. Anderson, Jr., Detroit, Mich., assignor to Accessory Research Corporation, Detroit, Mich., a corporation of Michigan Application March 29, 1950, Serial No. 152,600

4 Claims. (Cl. 248—205)

1

This invention relates to a rear view mirror assembly having a mirror arm or bracket and in particular to improved means for attaching the base or inner end of the mirror bracket to an automobile or other vehicle to afford vision to the rear thereof.

An object of the invention is to provide an improved rear view mirror assembly comprising a mounting bracket rigidly attachable to an exterior structure of the vehicle, such as a door or body panel, and a separable mirror supporting bracket, the two brackets having portions adapted to be interengaged so as to force the miror bracket tightly against the vehicle body panel and clamp the same in position against displacement in any direction. In accordance with the embodiment of the invention herein illustrated the mirror supporting bracket is not only forced tightly against the body or door panel by a cam or wedging action but is also clamped to the mounting bracket, these operations being simultaneously accomplished through the medium of a single screw threaded means.

A further object of the invention is to provide an improved rear view mirror assembly embodying a cam bracket attachable to the vehicle and provided with a cam portion inclined toward the vehicle, and also embodying a mirror supporting bracket having a hollow inner end or base adapted to fit over the cam bracket against the vehicle, the mirror supporting bracket being provided with a cam follower portion projecting into the hollow base in position to be forced along the surface of said cam portion, thereby causing the mirror supporting bracket to be forced tightly against the body or door panel, the operating medium for effecting the foregoing preferably comprising a screw extending through a wall of the hollow base at an inconspicuous locality and screwed into the cam bracket.

A further object of the invention is to provide a rear view mirror assembly comprising a mirror supporting bracket and mounting means for the bracket adapted to be concealed by the latter when in position on the vehicle body, said mounting means and bracket having coacting portions effective to force the bracket tightly against the body and clamp it rigidly in position upon operating a single screw threaded element connecting the bracket and mounting means together.

Still another object is to provide a rear view mirror assembly of the foregoing character wherein the interior walls of the hollow base of the mirror supporting bracket are provided with spaced clamping portions adapted to engage di-

2 verging portions of the cam bracket so as to clamp the mirror bracket tightly against vertical displacement on the body or door panel during operation of the vehicle.

Other objects of this invention will appear in the following description and appended claims, reference being had to the accompanying drawings forming a part of this specification wherein like reference characters designate corresponding parts in the several views.

Fig. 1 is a fragmentary plan view partially in horizontal section showing a rear view mirror assembly constructed and mounted on a panel support in accordance with the present invention.

Fig. 2 is a fragmentary vertical section taken in the direction of the arrows substantially along the line 2—2 of Fig. 1.

Fig. 3 is a view similar to Fig. 1, showing the assembly before being cammed tightly against the panel support.

Fig. 4 is a perspective view of a cam bracket embodying the present invention.

Fig. 5 is a fragmentary vertical section taken in the direction of the arrows substantially along the line 5—5 of Fig. 3.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Fig. 1, the mirror assembly shown comprises a mirror head 10 with a reflecting element 12 adjustably mounted on the outer end of a mirror arm or bracket 14. The latter is provided with a hollow elongated base portion 14a of U-section, Fig. 2, open at its inner end and adapted to rest solidly against a panel 16 which may comprise an exterior panel of an automobile body or door. The bracket 14 in the present instance is particularly designed to extend horizontally outward from the panel 16 with the base portion 14a extending horizontally and longitudinally forward from the head 10, as for example along the automobile belt line. Each of the upper and lower interior walls of the base 14a is provided with a pair of integral interior bosses, comprising a wedging boss 18 and a guide boss or cam member 20 having a chamfered cam follower end 22. The bosses 18 and 20 on each wall are spaced longitudinally of the vehicle and extend outward therefrom in the assembled position, with their interior edges parallel to and spaced vertically from the corresponding edges of the bosses on the other wall, Fig. 5.

Dimensioned to fit within the hollow base 14a snugly between the vertically spaced bosses 18 is a cam bracket, Fig. 4, preferably formed from strip steel to provide a plane cam portion 24 terminating in a short forward leg 26 and a long rearward leg 28, which in turn terminate in forward and rearward extending footings 30 and 32. The latter are adapted to rest solidly against the panel 16 and to be rigidly secured thereto by screws 34, with the legs 26, 28 extending outward and the cam portion 24 sloping inwardly and forwardly toward the panel 16. As indicated in Fig. 5, the upper and lower edges of the cam bracket are parallel with the exception of the edges 30a of the footing 30 which diverge slightly forwardly.

The upper and lower edges of the cam bracket are each notched at 36 between the outermost end of the leg 28 and the rearmost end of the cam portion 24 to provide a pair of vertically spaced guide openings adapted for passage of the guide bosses or cam members 20. Accordingly, after securing the cam bracket to the panel 16, the mirror bracket 14 may be readily moved directly toward the panel 16 to enclose and conceal the cam bracket, Fig. 3, by passing the guide bosses or cam members 20 through the notches 36 and sliding the wedging bosses 18 along the forward edges of the cam portion 24 above and below the latter. The upper and lower edges of the leg 28 also serve as guides or locators for the vertically spaced cam members 20, locating the chamfered ends 22 after passage through the notches 36 at a camming position adjacent the rearward end of the cam portion 24 to be cammed thereby toward the panel 16 upon forward movement of the bracket 14.

The cam action is accomplished by means of a screw 38 having its head retained in a countersunk hole 40 in the rearward wall of the hollow base 14a and having its shank extended horizontally forward through the hole 40 and screwed into a threaded hole 42 in the leg 28. It is to be noted in this regard that upon assembly of the bracket 14 over the cam bracket, the cam members 20 passing through the notches 36, in cooperation with the bosses 18 adjacent the edges of the cam portion 24, guide the bracket 14 to the camming position adjacent the panel 16 and align the screw holes 40 and 42 to facilitate the initial threading of the blind forward end of the screw shank into the threaded hole 42. Rearward movement of the backet 14 from the initial camming position prior to assembly of the screw 38 is prevented by engagement between the members 20 and the edges of the leg 28.

Upon tightening the screw 38, the bracket 14 is driven forwardly and the chamfered ends 22 of the cam members 20 are forced along the inclined cam wall 24 toward the panel 16 to cam and thereby draw the bracket base 14a tightly against the panel. The leg 28 of the cam bracket possesses sufficient resiliency so as to exert a tensioning action on the screw 38 as it is driven through the threaded hole 42, thereby binding the screw within the hole and preventing the screw from loosening during operation of the vehicle. During the camming action between members 20 and cam wall 24, the bosses 18 are forced along and in engagement with the diverging edges 30a of the flange 30, thereby tightly clamping the flange 30 between said bosses and rigidly holding the bracket 14 against vertical displacement on the door or body panel.

From the foregoing it will be seen that upon tightening the screw 38, the mirror bracket 14 will be firmly secured against movement in any direction relative to the cam bracket and the door or body panel. Both forward and rearward movement of the mirror bracket will be prevented by the opposed forces exerted by the screw 38 and cam 24. Moreover, the coaction of the cam 24 and the cam members 20 will serve to draw and clamp the bracket 14 tightly against the panel 16. In addition the bracket 14 will be rigidly held against vertical movement, i. e. movement along the panel 16, by the clamping action between the edges 30a and the bosses 18.

I claim:

1. In a mirror assembly, a cam bracket attachable to a support, a mirror bracket, the two brackets having interengageable cam portions adapted to cam the mirror bracket tightly against the support upon movement of the mirror bracket in one direction along the support and also having interengageable wedge portions adapted to hold the mirror bracket against movement relative to the cam bracket in a direction along the support transverse to said first named direction, and screw means engageable with the two brackets to cause said movement by screw driven operation, said screw means having a threaded shank adapted to extend generally parallel to said first named direction and accessible at one end adjacent an outer side of the mirror bracket for screw operation.

2. In a rear vision mirror assembly, a mirror bracket having a cam follower and spaced wedging members, a cam bracket having a cam surface and a wedging portion and being attachable to the support with the cam surface confronting the support and inclined thereto, the mirror bracket being adapted to be removably assembled adjacent the support with the follower engaging the cam surface intermediate the latter and the support and with the wedging portion spacing the wedging members, and means engageable with the two brackets and operative to effect movement of the follower along the cam surface toward the support, the wedging portion and members being cooperable in a wedge action upon said movement to bind the mirror bracket against movement in a direction along the cam surface perpendicular to the direction of inclination thereof toward the support.

3. In a rear view mirror assembly, a cam bracket having a cam surface and being attachable to a surface of a vehicle with the cam surface inclined thereto, a mirror bracket having a hollow base adapted to overlie the bracket member and abut the vehicle surface and having a cam follower projecting into the hollow base to engage and ride along the cam surface, and screw means engageable with the two brackets to move the cam follower along the cam surface toward the support and thereby move the mirror bracket tightly against the vehicle surface, said screw means having an operating end extending exteriorly through a sidewall of the hollow mirror bracket.

4. In a means for attaching a mirror bracket to a support, a cam bracket having a cam surface and a screw threaded means and being attachable to the support with the cam surface confronting the support and inclined thereto and with the axis of the screw means extending generally tangentially of the support, the cam surface terminating at its outer end in a guide opening for passage of a cam follower of the mirror bracket therethrough, the cam bracket also having wedging surfaces transverse to the cam surface and diverging in the direction of inclination of the latter toward the support.

JAMES W. ANDERSON, JR.

REFERENCES CITED

The following references are of record in the file of this patent:

UNITED STATES PATENTS

| Number | Name | Date |
|---|---|---|
| 2,138,647 | Schofield | Nov. 29, 1938 |
| 2,309,333 | Bahr | Jan. 26, 1943 |
| 2,447,786 | Anderson | Aug. 24, 1948 |
| 2,495,123 | Morley | Jan. 17, 1950 |